(12) United States Patent
Kaizuka

(10) Patent No.: US 7,233,210 B2
(45) Date of Patent: *Jun. 19, 2007

(54) SPREAD SPECTRUM CLOCK GENERATOR

(75) Inventor: Masao Kaizuka, San Jose, CA (US)

(73) Assignee: Toshiba America Electric Components, Inc., Irvine, CA (US)

( * ) Notice: Subject to any disclaimer, the term of this patent is extended or adjusted under 35 U.S.C. 154(b) by 470 days.

This patent is subject to a terminal disclaimer.

(21) Appl. No.: 10/770,643

(22) Filed: Feb. 2, 2004

(65) Prior Publication Data

US 2006/0146971 A1 Jul. 6, 2006

Related U.S. Application Data

(63) Continuation-in-part of application No. 10/647,929, filed on Aug. 26, 2003.

(51) Int. Cl.
*H03L 7/00* (2006.01)

(52) U.S. Cl. .................. 331/1 A; 331/78; 332/123; 375/376; 375/130; 713/500

(58) Field of Classification Search .............. 331/1 A, 331/78; 332/123; 375/376, 130; 713/500
See application file for complete search history.

(56) References Cited

U.S. PATENT DOCUMENTS

| | | | |
|---|---|---|---|
| 3,833,854 A | 9/1974 | Schonover | |
| 5,118,975 A | 6/1992 | Hillis et al. | |
| 5,488,627 A | 1/1996 | Harden et al. | |
| 5,631,920 A | 5/1997 | Hardin | |
| 5,675,832 A | 10/1997 | Ikami et al. | |
| 5,867,524 A | 2/1999 | Booth et al. | |
| 5,872,807 A | 2/1999 | Booth et al. | |
| 6,144,242 A | 11/2000 | Jeong et al. | |
| 6,404,834 B1 | 6/2002 | Hardin et al. | |
| 6,501,307 B1 | 12/2002 | Yen | |
| 6,553,057 B1 | 4/2003 | Sha et al. | |
| 6,993,109 B2 * | 1/2006 | Lee et al. | 375/376 |

* cited by examiner

*Primary Examiner*—Arnold Kinkead
(74) *Attorney, Agent, or Firm*—Tucker Ellis & West LLP

(57) ABSTRACT

A clock signal generator varies a frequency of a digital clock over a selected range of frequencies. The generator employs a divider for lowering a frequency of a clock signal. A counter increments synchronously with the signal, and causes a selected sequence of outputs to be generated by a pattern generator. The pattern generator output forms an input to a digitally controllable delay line which receives the lower frequency clock signal. The pattern generator causes the digital delay line to vary a frequency of the lowered frequency clock signal between selected boundaries. The varying frequency clock signal is then raised up again such that a final clock has a varying frequency, and will exhibit less EMI spiking during switching of an associated, synchronous digital data device. The solid state nature of the generator allows for simple fabrication, inexpensive manufacture and ready integration into digital circuitry, such as multifunction integrated circuits.

15 Claims, 8 Drawing Sheets

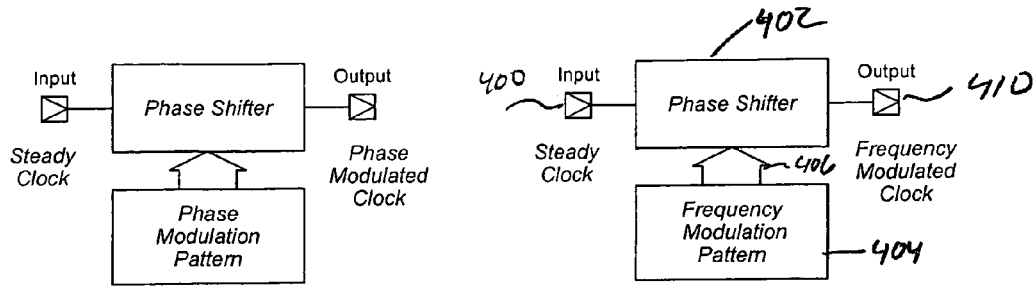
Fig. 8a
Prior Art
Fig. 8b
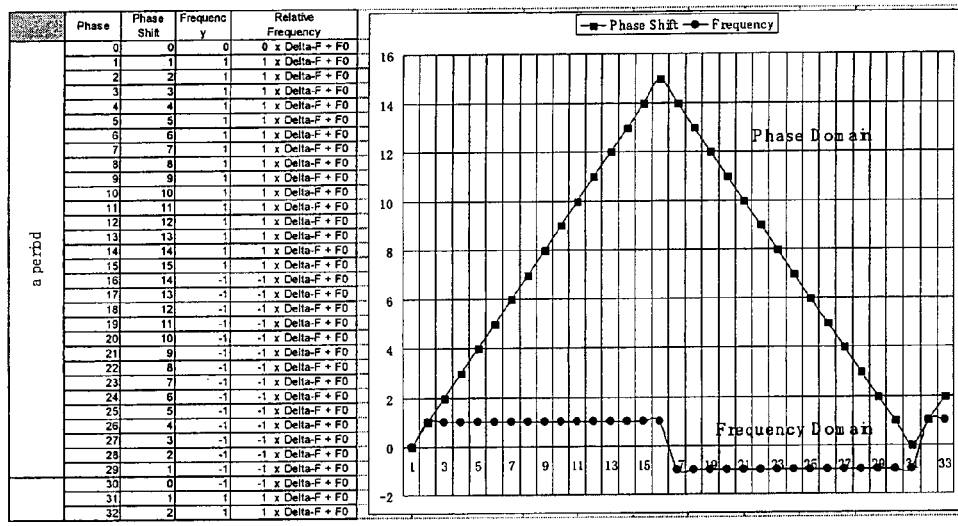
Fig. 9a
Fig. 9b

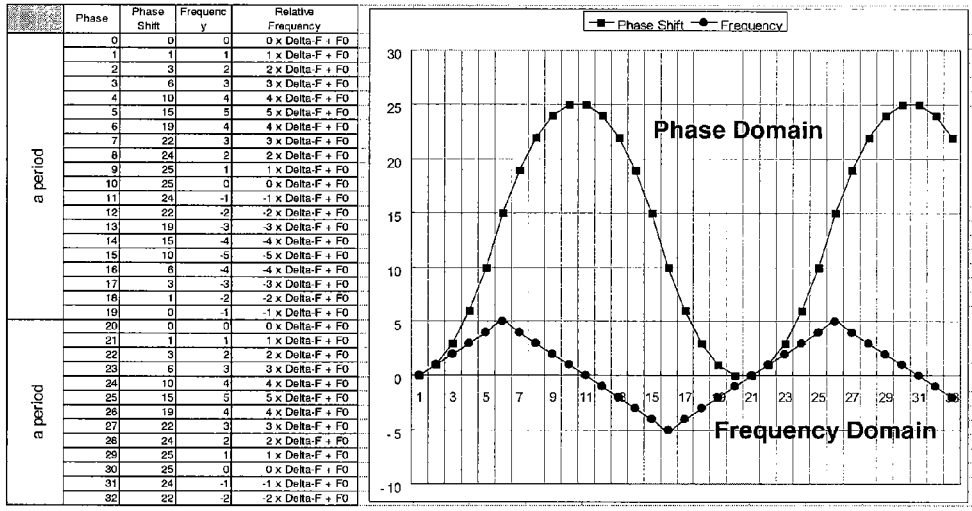
*Fig. 10a*     *Fig. 10b*
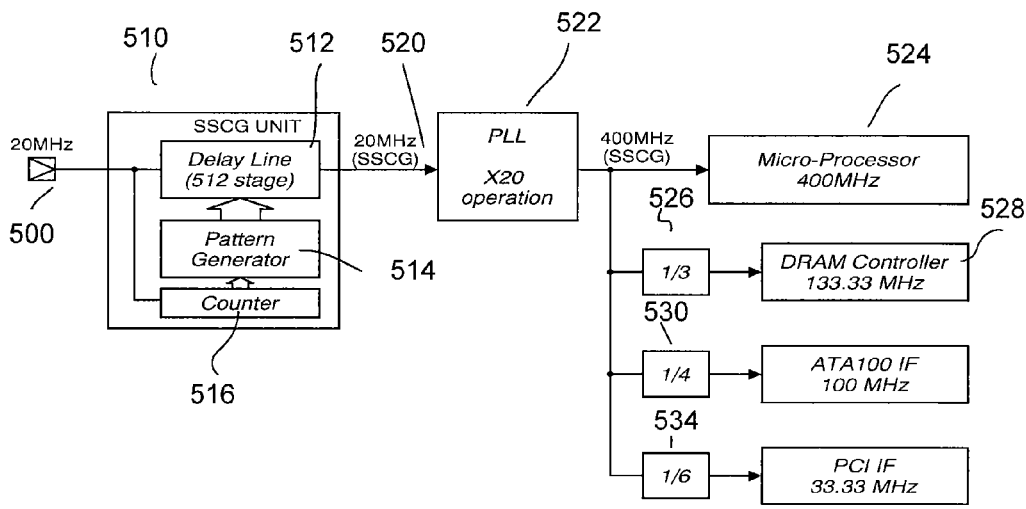
*Fig. 11*

| STEP | VALUE | STEP | VALUE | STEP | VALUE | STEP | VALUE | STEP | VALUE | STEP | VALUE | STEP | VALUE | STEP | VALUE |
|---|---|---|---|---|---|---|---|---|---|---|---|---|---|---|---|
| 0 | 0 | 64 | 66 | 128 | 260 | 192 | 448 | 256 | 508 | 320 | 444 | 384 | 252 | 448 | 62 |
| 1 | 0 | 65 | 68 | 129 | 264 | 193 | 450 | 257 | 508 | 321 | 442 | 385 | 248 | 449 | 60 |
| 2 | 0 | 66 | 70 | 130 | 268 | 194 | 452 | 258 | 508 | 322 | 440 | 386 | 244 | 450 | 58 |
| 3 | 0 | 67 | 72 | 131 | 272 | 195 | 454 | 259 | 508 | 323 | 438 | 387 | 240 | 451 | 56 |
| 4 | 0 | 68 | 74 | 132 | 276 | 196 | 456 | 260 | 508 | 324 | 436 | 388 | 236 | 452 | 54 |
| 5 | 0 | 69 | 76 | 133 | 280 | 197 | 458 | 261 | 508 | 325 | 434 | 389 | 232 | 453 | 52 |
| 6 | 0 | 70 | 78 | 134 | 284 | 198 | 460 | 262 | 508 | 326 | 432 | 390 | 228 | 454 | 50 |
| 7 | 0 | 71 | 80 | 135 | 288 | 199 | 462 | 263 | 508 | 327 | 430 | 391 | 224 | 455 | 48 |
| 8 | 0 | 72 | 82 | 136 | 291 | 200 | 463 | 264 | 508 | 328 | 428 | 392 | 220 | 456 | 46 |
| 9 | 1 | 73 | 85 | 137 | 295 | 201 | 465 | 265 | 508 | 329 | 426 | 393 | 217 | 457 | 45 |
| 10 | 1 | 74 | 87 | 138 | 298 | 202 | 466 | 266 | 507 | 330 | 423 | 394 | 213 | 458 | 43 |
| 11 | 2 | 75 | 90 | 139 | 302 | 203 | 468 | 267 | 507 | 331 | 421 | 395 | 210 | 459 | 42 |
| 12 | 2 | 76 | 92 | 140 | 305 | 204 | 469 | 268 | 506 | 332 | 418 | 396 | 206 | 460 | 40 |
| 13 | 3 | 77 | 95 | 141 | 309 | 205 | 471 | 269 | 506 | 333 | 416 | 397 | 203 | 461 | 39 |
| 14 | 3 | 78 | 97 | 142 | 312 | 206 | 472 | 270 | 505 | 334 | 413 | 398 | 199 | 462 | 37 |
| 15 | 4 | 79 | 100 | 143 | 316 | 207 | 474 | 271 | 505 | 335 | 411 | 399 | 196 | 463 | 36 |
| 16 | 4 | 80 | 102 | 144 | 319 | 208 | 475 | 272 | 504 | 336 | 408 | 400 | 192 | 464 | 34 |
| 17 | 5 | 81 | 105 | 145 | 323 | 209 | 477 | 273 | 504 | 337 | 406 | 401 | 189 | 465 | 33 |
| 18 | 5 | 82 | 107 | 146 | 326 | 210 | 478 | 274 | 503 | 338 | 403 | 402 | 185 | 466 | 31 |
| 19 | 6 | 83 | 110 | 147 | 330 | 211 | 480 | 275 | 503 | 339 | 401 | 403 | 182 | 467 | 30 |
| 20 | 6 | 84 | 112 | 148 | 333 | 212 | 481 | 276 | 502 | 340 | 398 | 404 | 178 | 468 | 28 |
| 21 | 7 | 85 | 115 | 149 | 337 | 213 | 483 | 277 | 502 | 341 | 396 | 405 | 175 | 469 | 27 |
| 22 | 7 | 86 | 117 | 150 | 340 | 214 | 484 | 278 | 501 | 342 | 393 | 406 | 171 | 470 | 25 |
| 23 | 8 | 87 | 120 | 151 | 343 | 215 | 485 | 279 | 501 | 343 | 391 | 407 | 168 | 471 | 24 |
| 24 | 9 | 88 | 123 | 152 | 346 | 216 | 486 | 280 | 500 | 344 | 388 | 408 | 165 | 472 | 23 |
| 25 | 10 | 89 | 126 | 153 | 349 | 217 | 487 | 281 | 499 | 345 | 385 | 409 | 162 | 473 | 22 |
| 26 | 11 | 90 | 129 | 154 | 352 | 218 | 488 | 282 | 498 | 346 | 382 | 410 | 159 | 474 | 21 |
| 27 | 12 | 91 | 132 | 155 | 355 | 219 | 489 | 283 | 497 | 347 | 379 | 411 | 156 | 475 | 20 |
| 28 | 13 | 92 | 135 | 156 | 358 | 220 | 490 | 284 | 496 | 348 | 376 | 412 | 153 | 476 | 19 |
| 29 | 14 | 93 | 138 | 157 | 361 | 221 | 491 | 285 | 495 | 349 | 373 | 413 | 150 | 477 | 18 |
| 30 | 15 | 94 | 141 | 158 | 364 | 222 | 492 | 286 | 494 | 350 | 370 | 414 | 147 | 478 | 17 |
| 31 | 16 | 95 | 144 | 159 | 367 | 223 | 493 | 287 | 493 | 351 | 367 | 415 | 144 | 479 | 16 |
| 32 | 17 | 96 | 147 | 160 | 370 | 224 | 494 | 288 | 492 | 352 | 364 | 416 | 141 | 480 | 15 |
| 33 | 18 | 97 | 150 | 161 | 373 | 225 | 495 | 289 | 491 | 353 | 361 | 417 | 138 | 481 | 14 |
| 34 | 19 | 98 | 153 | 162 | 376 | 226 | 496 | 290 | 490 | 354 | 358 | 418 | 135 | 482 | 13 |
| 35 | 20 | 99 | 156 | 163 | 379 | 227 | 497 | 291 | 489 | 355 | 355 | 419 | 132 | 483 | 12 |
| 36 | 21 | 100 | 159 | 164 | 382 | 228 | 498 | 292 | 488 | 356 | 352 | 420 | 129 | 484 | 11 |
| 37 | 22 | 101 | 162 | 165 | 385 | 229 | 499 | 293 | 487 | 357 | 349 | 421 | 126 | 485 | 10 |
| 38 | 23 | 102 | 165 | 166 | 388 | 230 | 500 | 294 | 486 | 358 | 346 | 422 | 123 | 486 | 9 |
| 39 | 24 | 103 | 168 | 167 | 391 | 231 | 501 | 295 | 485 | 359 | 343 | 423 | 120 | 487 | 8 |
| 40 | 25 | 104 | 171 | 168 | 393 | 232 | 501 | 296 | 484 | 360 | 340 | 424 | 117 | 488 | 7 |
| 41 | 27 | 105 | 175 | 169 | 396 | 233 | 502 | 297 | 483 | 361 | 337 | 425 | 115 | 489 | 7 |
| 42 | 28 | 106 | 178 | 170 | 398 | 234 | 502 | 298 | 481 | 362 | 333 | 426 | 112 | 490 | 6 |
| 43 | 30 | 107 | 182 | 171 | 401 | 235 | 503 | 299 | 480 | 363 | 330 | 427 | 110 | 491 | 6 |
| 44 | 31 | 108 | 185 | 172 | 403 | 236 | 503 | 300 | 478 | 364 | 326 | 428 | 107 | 492 | 5 |
| 45 | 33 | 109 | 189 | 173 | 406 | 237 | 504 | 301 | 477 | 365 | 323 | 429 | 105 | 493 | 5 |
| 46 | 34 | 110 | 192 | 174 | 408 | 238 | 504 | 302 | 475 | 366 | 319 | 430 | 102 | 494 | 4 |
| 47 | 36 | 111 | 196 | 175 | 411 | 239 | 505 | 303 | 474 | 367 | 316 | 431 | 100 | 495 | 4 |
| 48 | 37 | 112 | 199 | 176 | 413 | 240 | 505 | 304 | 472 | 368 | 312 | 432 | 97 | 496 | 3 |
| 49 | 39 | 113 | 203 | 177 | 416 | 241 | 506 | 305 | 471 | 369 | 309 | 433 | 95 | 497 | 3 |
| 50 | 40 | 114 | 206 | 178 | 418 | 242 | 506 | 306 | 469 | 370 | 305 | 434 | 92 | 498 | 2 |
| 51 | 42 | 115 | 210 | 179 | 421 | 243 | 507 | 307 | 468 | 371 | 302 | 435 | 90 | 499 | 2 |
| 52 | 43 | 116 | 213 | 180 | 423 | 244 | 507 | 308 | 466 | 372 | 298 | 436 | 87 | 500 | 1 |
| 53 | 45 | 117 | 217 | 181 | 426 | 245 | 508 | 309 | 465 | 373 | 295 | 437 | 85 | 501 | 1 |
| 54 | 46 | 118 | 220 | 182 | 428 | 246 | 508 | 310 | 463 | 374 | 291 | 438 | 82 | 502 | 0 |
| 55 | 48 | 119 | 224 | 183 | 430 | 247 | 508 | 311 | 462 | 375 | 288 | 439 | 80 | 503 | 0 |
| 56 | 50 | 120 | 228 | 184 | 432 | 248 | 508 | 312 | 460 | 376 | 284 | 440 | 78 | 504 | 0 |
| 57 | 52 | 121 | 232 | 185 | 434 | 249 | 508 | 313 | 458 | 377 | 280 | 441 | 76 | 505 | 0 |
| 58 | 54 | 122 | 236 | 186 | 436 | 250 | 508 | 314 | 456 | 378 | 276 | 442 | 74 | 506 | 0 |
| 59 | 56 | 123 | 240 | 187 | 438 | 251 | 508 | 315 | 454 | 379 | 272 | 443 | 72 | 507 | 0 |
| 60 | 58 | 124 | 244 | 188 | 440 | 252 | 508 | 316 | 452 | 380 | 268 | 444 | 70 | 508 | 0 |
| 61 | 60 | 125 | 248 | 189 | 442 | 253 | 508 | 317 | 450 | 381 | 264 | 445 | 68 | 509 | 0 |
| 62 | 62 | 126 | 252 | 190 | 444 | 254 | 508 | 318 | 448 | 382 | 260 | 446 | 66 | 510 | 0 |
| 63 | 64 | 127 | 256 | 191 | 446 | 255 | 508 | 319 | 446 | 383 | 256 | 447 | 64 | 511 | 0 |

*Fig. 12*

SPREAD SPECTRUM CLOCK GENERATOR

This application is a Continuation-In-Part of U.S. Ser. No. 10/647,929 entitled "Spread Spectrum Clock Generator" filed Aug. 26, 2003, which is incorporated by reference in its entirety, herein.

BACKGROUND OF THE INVENTION

The subject application is directed generally to the art of synchronous digital circuitry, and more particularly to synchronous digital circuitry in which a lessened effect of electromagnetic interference ("EMI") is desirable.

Most digital devices today operate synchronously. That is, data processing operations occur under a timing dictated by a digital clock signal. Such digital clock signals are typically square waves that oscillate at a selected frequency. As improvements are made to digital processing devices, clock frequencies may be increased. Faster clock frequencies allow for improved data processing throughput. Current digital clock frequencies are already in the multi-gigahertz range. As clock frequencies continue to rise, an increased incidence of electromagnetic interference exists. Such EMI requires that special shielding or casing be developed to dampen such interference. EMI can cause data errors in associated data processing devices, as well as provide for radio frequency ("RF") interference for analog devices such as radios and televisions.

Designers have become aware that implementing a spread spectrum clock generator ("SSCG") works to substantially reduce the high energy spikes associated with digitally-generated EMI.

SSCG circuitry functions to vary slightly a frequency of a digital clock signal over time. This is accomplished by reducing "noise" associated with harmonics of a large scale integration ("LSI") clock signal. SSCG circuitry functions to alter slightly a signal interval and thus diffuses a frequency spectrum and lowers a peak value.

A side effect from the use of an SSCG is an introduction of a slight jitter in the system clock. However, such jitter is generally of little consequence other than in particular applications relating to communication network interfaces or input/output interfaces, as well as other applications having varying tolerance to jitter. Thus, it is desirable to be able to vary a degree of frequency shift and associated jitter to accommodate a lessening of peak EMI while simultaneously minimizing the jitter to acceptable application parameters.

Current SSCG circuitry employs frequency comparators and voltage controlled oscillators ("VCO") to accomplish the shifting of frequency to result in a modulated clock signal. While effective, such analog-based implementations render it difficult and expensive to accomplish an SSCG circuitry, particularly in applications when a system is desired to coexist on other standard digital circuitry and in conjunction with a single substrate.

The subject invention provides for a digital spread spectrum clock generator which accomplishes selected frequency variation of an associated digital clock while minimizing the required use of extensive or incompatible analog circuitry.

SUMMARY OF THE INVENTION

In accordance with the subject invention, there is provided a spread spectrum clock generator which includes a divider for lowering a frequency of an input clock signal. A digital counter is incremented synchronously with the clock signal. The counter, in turn, processes through a selected sequence of outputs to be generated by a pattern generator. The pattern generator output, in turn, is communicated to a digitally controllable delay circuit into which the lowered frequency clock signal is provided. Thus, a variation in frequency to the clock signal is controlled by the selected pattern in the pattern generator. This varying frequency clock signal is then multiplied to a higher overall frequency compatible with the original clock signal, and output as a clock signal to remaining, synchronous digital circuitry.

In accordance with another aspect of the present invention, the frequency variation of the modified clock signal is toggled between a selected higher limit and selected lower limit.

In accordance with another aspect of the present invention, a method is provided for generating a spread spectrum clock signal in accordance with the foregoing.

SUMMARY OF THE DRAWINGS

The subject invention is described with reference to certain parts, and arrangements to parts, which are evidenced in conjunction with the associated drawings which form a part hereof and not for the purposes of limiting the same in which:

FIG. 8a and FIG. 8b illustrate the difference between "Phase Modulation" and "Frequency Modulation" based on the modulation pattern difference.

FIGS. 9a and 9b illustrate an example of "Phase Modulation Pattern" and its result waveform.

FIGS. 10a and 10b illustrate an example of "Frequency Modulation Pattern" based on this invention and its result waveform.

FIG. 11 shows an integrated circuit of the present invention with external peripheral devices such as ATA100, PCI Controller.

FIG. 12 shows the contents of pattern generator, which modulates 20 MHz source clock used in a particular application.

DETAILED DESCRIPTION OF THE PREFERRED EMBODIMENT

Figure 1A:
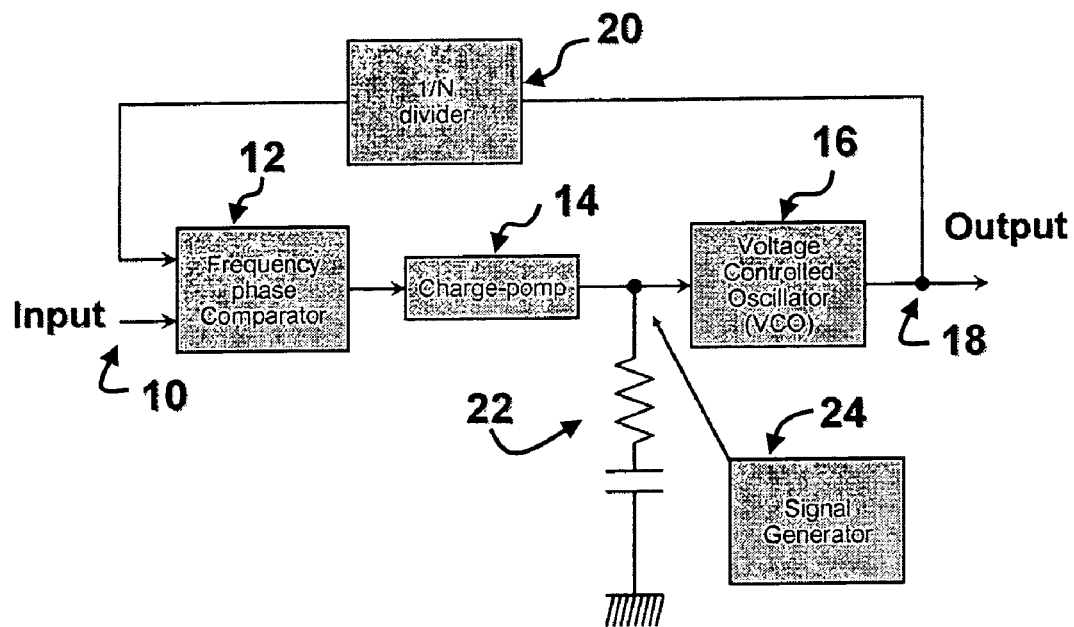
FIG. 1 is a schematic of a conventional spread spectrum clock generator.

Turning now to the drawings wherein the illustrations are for illustrating the preferred embodiment only, and not for delivering the same, FIG. 1A shows a block diagram of a conventional spread spectrum clock generator. In a conventional system, a clock input 10 was provided as one input to a frequency phase comparator 12. An output of the comparator 12 was provided to a charge pump 14, the output of which is provided to a voltage controlled oscillator ("VCO 16"). Output 18 of the VCO 16 forms a system clock output, as well as a feedback loop into frequency comparator 12 via a 1/N divider 20.

A conventional spread spectrum clock generator employed an RC circuit 22 as a filter to ground. A signal generator 24 served to generate a waveform (such as that evidenced in FIG. 1B) into the input of the VCO 16. By injecting this signal into the VCO input, an output frequency at output 18 was modulated in conjunction with the waveform of FIG. 1B.

Figure 1B:
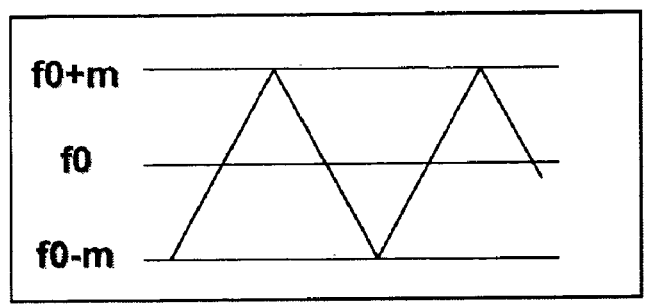

It will be appreciated by the view of FIGS. 1A and 1B that the basic circuitry employed in the spread spectrum clock generator was that of a phase lock loop. The system, while functional, relied heavily on analog circuitry and was thus not readily adaptable to implementation in conjunction with digital circuitry.

Figure 2:
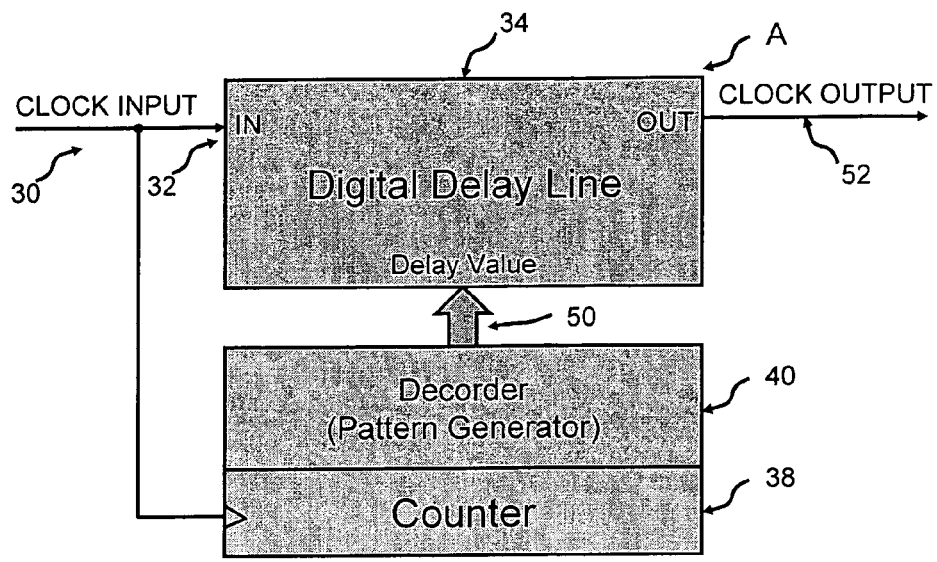
FIG. 2 is a diagram of the improved spread spectrum clock generator of the present invention.

Turning now to FIG. 2, the basic architecture of the spread spectrum clock generator of the present invention is described. The SSCG A includes a clock input 30, which input is provided by the standard clock generated in conjunction with a frequency associated with an associated synchronous digital system. The clock input from 30 is communicated to an input 32 of a digital delay line 34. The input 30 is also communicated to an input 36 of a counter 38. The counter 38 is suitably comprised of any simple binary counter. In the preferred embodiment, the counter 38 functions to count an increment on the basis of a number of input clock signals generated at counter input 36.

The counter 38 is in data communication with the pattern generator 40 through its output lines thereof (not shown). In a simple binary counter, a series of binary lines are provided which correspond to a base numeric sequence. In a preferred embodiment, a particular binary number placed on an input to the pattern generator results in the providing of a preselected digital value at an output 50 thereof. A particular pattern of a pattern generator 40 of the preferred embodiment will be detailed in conjunction with Table 1, below. In the preferred embodiment, sequencing the counter 38 will result in a periodically repeating pattern being generated by pattern generator 4 at output 50.

TABLE 1

The TRUTH table of Pattern Generator

| S | D | V |
|---|---|---|
| 0 | 0 | 16 |
| 1 | 0 | 16 |
| 2 | 0 | 16 |
| 3 | 1 | 17 |
| 4 | 0 | 17 |
| 5 | 0 | 17 |
| 6 | 0 | 17 |
| 7 | 0 | 17 |
| 8 | 1 | 18 |
| 9 | 0 | 18 |
| 10 | 0 | 18 |
| 11 | 0 | 18 |
| 12 | 1 | 19 |
| 13 | 0 | 19 |
| 14 | 0 | 19 |
| 15 | 1 | 20 |
| 16 | 0 | 20 |
| 17 | 1 | 21 |
| 18 | 0 | 21 |
| 19 | 1 | 22 |
| 20 | 0 | 22 |
| 21 | 1 | 23 |
| 22 | 0 | 23 |
| 23 | 1 | 24 |
| 24 | 0 | 24 |
| 25 | 1 | 25 |
| 26 | 0 | 25 |
| 27 | 1 | 26 |
| 28 | 1 | 27 |
| 29 | 0 | 27 |
| 30 | 1 | 28 |
| 31 | 1 | 29 |
| 32 | 1 | 30 |
| 33 | 0 | 30 |
| 34 | 1 | 31 |
| 35 | 1 | 32 |
| 36 | 1 | 33 |
| 37 | 1 | 34 |
| 38 | 0 | 34 |
| 39 | 1 | 35 |
| 40 | 1 | 36 |
| 41 | 1 | 37 |
| 42 | 1 | 38 |
| 43 | 1 | 39 |
| 44 | 1 | 40 |
| 45 | 2 | 42 |
| 46 | 1 | 43 |
| 47 | 1 | 44 |
| 48 | 1 | 45 |
| 49 | 1 | 46 |
| 50 | 2 | 48 |
| 51 | 1 | 49 |
| 52 | 1 | 50 |
| 53 | 1 | 51 |
| 54 | 2 | 53 |
| 55 | 1 | 54 |
| 56 | 1 | 55 |
| 57 | 2 | 57 |
| 58 | 1 | 58 |
| 59 | 2 | 60 |
| 60 | 1 | 61 |
| 61 | 2 | 63 |
| 62 | 1 | 64 |
| 63 | 2 | 66 |
| 64 | 1 | 67 |
| 65 | 2 | 69 |
| 66 | 1 | 70 |
| 67 | 2 | 72 |
| 68 | 1 | 73 |
| 69 | 2 | 75 |
| 70 | 2 | 77 |
| 71 | 1 | 78 |
| 72 | 2 | 80 |
| 73 | 2 | 82 |
| 74 | 2 | 84 |
| 75 | 1 | 85 |
| 76 | 2 | 87 |
| 77 | 2 | 89 |
| 78 | 2 | 91 |
| 79 | 2 | 93 |
| 80 | 1 | 94 |
| 81 | 2 | 96 |
| 82 | 2 | 98 |
| 83 | 2 | 100 |
| 84 | 2 | 102 |
| 85 | 2 | 104 |
| 86 | 2 | 106 |
| 87 | 3 | 109 |
| 88 | 2 | 111 |
| 89 | 2 | 113 |
| 90 | 2 | 115 |
| 91 | 2 | 117 |
| 92 | 3 | 120 |
| 93 | 2 | 122 |
| 94 | 2 | 124 |

TABLE 1-continued

The TRUTH table of Pattern Generator

| S | D | V |
|---|---|---|
| 95 | 2 | 126 |
| 96 | 3 | 129 |
| 97 | 2 | 131 |
| 98 | 2 | 133 |
| 99 | 3 | 136 |
| 100 | 2 | 138 |
| 101 | 3 | 141 |
| 102 | 2 | 143 |
| 103 | 3 | 146 |
| 104 | 2 | 148 |
| 105 | 3 | 151 |
| 106 | 2 | 153 |
| 107 | 3 | 156 |
| 108 | 2 | 158 |
| 109 | 3 | 161 |
| 110 | 2 | 163 |
| 111 | 3 | 166 |
| 112 | 3 | 169 |
| 113 | 2 | 171 |
| 114 | 3 | 174 |
| 115 | 3 | 177 |
| 116 | 3 | 180 |
| 117 | 2 | 182 |
| 118 | 3 | 185 |
| 119 | 3 | 188 |
| 120 | 3 | 191 |
| 121 | 3 | 194 |
| 122 | 2 | 196 |
| 123 | 3 | 199 |
| 124 | 3 | 202 |
| 125 | 3 | 205 |
| 126 | 3 | 208 |
| 127 | 3 | 211 |
| 128 | 4 | 215 |
| 129 | 3 | 218 |
| 130 | 3 | 221 |
| 131 | 3 | 224 |
| 132 | 4 | 228 |
| 133 | 3 | 231 |
| 134 | 4 | 235 |
| 135 | 3 | 238 |
| 136 | 3 | 241 |
| 137 | 4 | 245 |
| 138 | 4 | 249 |
| 139 | 4 | 253 |
| 140 | 3 | 256 |
| 141 | 4 | 260 |
| 142 | 4 | 264 |
| 143 | 4 | 268 |
| 144 | 4 | 272 |
| 145 | 4 | 276 |
| 146 | 3 | 279 |
| 147 | 4 | 283 |
| 148 | 3 | 286 |
| 149 | 4 | 290 |
| 150 | 3 | 293 |
| 151 | 3 | 296 |
| 152 | 3 | 299 |
| 153 | 4 | 303 |
| 154 | 3 | 306 |
| 155 | 3 | 309 |
| 156 | 3 | 312 |
| 157 | 3 | 315 |
| 158 | 3 | 318 |
| 159 | 2 | 320 |
| 160 | 3 | 323 |
| 161 | 3 | 326 |
| 162 | 3 | 329 |
| 163 | 3 | 332 |
| 164 | 2 | 334 |
| 165 | 3 | 337 |
| 166 | 3 | 340 |
| 167 | 3 | 343 |
| 168 | 2 | 345 |
| 169 | 3 | 348 |
| 170 | 3 | 351 |
| 171 | 2 | 353 |
| 172 | 3 | 356 |
| 173 | 2 | 358 |
| 174 | 3 | 361 |
| 175 | 2 | 363 |
| 176 | 3 | 366 |
| 177 | 2 | 368 |
| 178 | 3 | 371 |
| 179 | 2 | 373 |
| 180 | 3 | 376 |
| 181 | 2 | 378 |
| 182 | 3 | 381 |
| 183 | 2 | 383 |
| 184 | 2 | 385 |
| 185 | 3 | 388 |
| 186 | 2 | 390 |
| 187 | 2 | 392 |
| 188 | 2 | 394 |
| 189 | 3 | 397 |
| 190 | 2 | 399 |
| 191 | 2 | 401 |
| 192 | 2 | 403 |
| 193 | 2 | 405 |
| 194 | 3 | 408 |
| 195 | 2 | 410 |
| 196 | 2 | 412 |
| 197 | 2 | 414 |
| 198 | 2 | 416 |
| 199 | 2 | 418 |
| 200 | 2 | 420 |
| 201 | 1 | 421 |
| 202 | 2 | 423 |
| 203 | 2 | 425 |
| 204 | 2 | 427 |
| 205 | 2 | 429 |
| 206 | 1 | 430 |
| 207 | 2 | 432 |
| 208 | 2 | 434 |
| 209 | 2 | 436 |
| 210 | 1 | 437 |
| 211 | 2 | 439 |
| 212 | 2 | 441 |
| 213 | 1 | 442 |
| 214 | 2 | 444 |
| 215 | 1 | 445 |
| 216 | 2 | 447 |
| 217 | 1 | 448 |
| 218 | 2 | 450 |
| 219 | 1 | 451 |
| 220 | 2 | 453 |
| 221 | 1 | 454 |
| 222 | 2 | 456 |
| 223 | 1 | 457 |
| 224 | 2 | 459 |
| 225 | 1 | 460 |
| 226 | 1 | 461 |
| 227 | 2 | 463 |
| 228 | 1 | 464 |
| 229 | 1 | 465 |
| 230 | 1 | 466 |
| 231 | 2 | 468 |
| 232 | 1 | 469 |
| 233 | 1 | 470 |
| 234 | 1 | 471 |
| 235 | 1 | 472 |
| 236 | 2 | 474 |
| 237 | 1 | 475 |
| 238 | 1 | 476 |
| 239 | 1 | 477 |
| 240 | 1 | 478 |
| 241 | 1 | 479 |
| 242 | 1 | 480 |
| 243 | 0 | 480 |
| 244 | 1 | 481 |

TABLE 1-continued

The TRUTH table of Pattern Generator

| S | D | V |
|---|---|---|
| 245 | 1 | 482 |
| 246 | 1 | 483 |
| 247 | 1 | 484 |
| 248 | 0 | 484 |
| 249 | 1 | 485 |
| 250 | 1 | 486 |
| 251 | 1 | 487 |
| 252 | 0 | 487 |
| 253 | 1 | 488 |
| 254 | 1 | 489 |
| 255 | 0 | 489 |
| 256 | 1 | 490 |
| 257 | 0 | 490 |
| 258 | 1 | 491 |
| 259 | 0 | 491 |
| 260 | 1 | 492 |
| 261 | 0 | 492 |
| 262 | 1 | 493 |
| 263 | 0 | 493 |
| 264 | 1 | 494 |
| 265 | 0 | 494 |
| 266 | 1 | 495 |
| 267 | 0 | 495 |
| 268 | 0 | 495 |
| 269 | 1 | 496 |
| 270 | 0 | 496 |
| 271 | 0 | 496 |
| 272 | 0 | 496 |
| 273 | 1 | 497 |
| 274 | 0 | 497 |
| 275 | 0 | 497 |
| 276 | 0 | 497 |
| 277 | 0 | 497 |
| 278 | 1 | 498 |
| 279 | 0 | 498 |
| 280 | 0 | 498 |
| 281 | 0 | 498 |
| 282 | 0 | 498 |
| 283 | 0 | 498 |
| 284 | 0 | 498 |
| 285 | −1 | 497 |
| 286 | 0 | 497 |
| 287 | 0 | 497 |
| 288 | 0 | 497 |
| 289 | 0 | 497 |
| 290 | −1 | 496 |
| 291 | 0 | 496 |
| 292 | 0 | 496 |
| 293 | 0 | 496 |
| 294 | −1 | 495 |
| 295 | 0 | 495 |
| 296 | 0 | 495 |
| 297 | −1 | 494 |
| 298 | 0 | 494 |
| 299 | −1 | 493 |
| 300 | 0 | 493 |
| 301 | −1 | 492 |
| 302 | 0 | 492 |
| 303 | −1 | 491 |
| 304 | 0 | 491 |
| 305 | −1 | 490 |
| 306 | 0 | 490 |
| 307 | −1 | 489 |
| 308 | 0 | 489 |
| 309 | −1 | 488 |
| 310 | −1 | 487 |
| 311 | 0 | 487 |
| 312 | −1 | 486 |
| 313 | −1 | 485 |
| 314 | −1 | 484 |
| 315 | 0 | 484 |
| 316 | −1 | 483 |
| 317 | −1 | 482 |
| 318 | −1 | 481 |
| 319 | −1 | 480 |
| 320 | 0 | 480 |
| 321 | −1 | 479 |
| 322 | −1 | 478 |
| 323 | −1 | 477 |
| 324 | −1 | 476 |
| 325 | −1 | 475 |
| 326 | −1 | 474 |
| 327 | −2 | 472 |
| 328 | −1 | 471 |
| 329 | −1 | 470 |
| 330 | −1 | 469 |
| 331 | −1 | 468 |
| 332 | −2 | 466 |
| 333 | −1 | 465 |
| 334 | −1 | 464 |
| 335 | −1 | 463 |
| 336 | −2 | 461 |
| 337 | −1 | 460 |
| 338 | −1 | 459 |
| 339 | −2 | 457 |
| 340 | −1 | 456 |
| 341 | −2 | 454 |
| 342 | −1 | 453 |
| 343 | −2 | 451 |
| 344 | −1 | 450 |
| 345 | −2 | 448 |
| 346 | −1 | 447 |
| 347 | −2 | 445 |
| 348 | −1 | 444 |
| 349 | −2 | 442 |
| 350 | −1 | 441 |
| 351 | −2 | 439 |
| 352 | −2 | 437 |
| 353 | −1 | 436 |
| 354 | −2 | 434 |
| 355 | −2 | 432 |
| 356 | −2 | 430 |
| 357 | −1 | 429 |
| 358 | −2 | 427 |
| 359 | −2 | 425 |
| 360 | −2 | 423 |
| 361 | −2 | 421 |
| 362 | −1 | 420 |
| 363 | −2 | 418 |
| 364 | −2 | 416 |
| 365 | −2 | 414 |
| 366 | −2 | 412 |
| 367 | −2 | 410 |
| 368 | −2 | 408 |
| 369 | −3 | 405 |
| 370 | −2 | 403 |
| 371 | −2 | 401 |
| 372 | −2 | 399 |
| 373 | −2 | 397 |
| 374 | −3 | 394 |
| 375 | −2 | 392 |
| 376 | −2 | 390 |
| 377 | −2 | 388 |
| 378 | −3 | 385 |
| 379 | −2 | 383 |
| 380 | −2 | 381 |
| 381 | −3 | 378 |
| 382 | −2 | 376 |
| 383 | −3 | 373 |
| 384 | −2 | 371 |
| 385 | −3 | 368 |
| 386 | −2 | 366 |
| 387 | −3 | 363 |
| 388 | −2 | 361 |
| 389 | −3 | 358 |
| 390 | −2 | 356 |
| 391 | −3 | 353 |
| 392 | −2 | 351 |
| 393 | −3 | 348 |
| 394 | −3 | 345 |

TABLE 1-continued

The TRUTH table of Pattern Generator

| S | D | V |
|---|---|---|
| 395 | −2 | 343 |
| 396 | −3 | 340 |
| 397 | −3 | 337 |
| 398 | −3 | 334 |
| 399 | −2 | 332 |
| 400 | −3 | 329 |
| 401 | −3 | 326 |
| 402 | −3 | 323 |
| 403 | −3 | 320 |
| 404 | −2 | 318 |
| 405 | −3 | 315 |
| 406 | −3 | 312 |
| 407 | −3 | 309 |
| 408 | −3 | 306 |
| 409 | −3 | 303 |
| 410 | −4 | 299 |
| 411 | −3 | 296 |
| 412 | −3 | 293 |
| 413 | −3 | 290 |
| 414 | −4 | 286 |
| 415 | −3 | 283 |
| 416 | −4 | 279 |
| 417 | −3 | 276 |
| 418 | −3 | 273 |
| 419 | −4 | 269 |
| 420 | −4 | 265 |
| 421 | −4 | 261 |
| 422 | −3 | 258 |
| 423 | −4 | 254 |
| 424 | −4 | 250 |
| 425 | −4 | 246 |
| 426 | −4 | 242 |
| 427 | −4 | 238 |
| 428 | −3 | 235 |
| 429 | −4 | 231 |
| 430 | −3 | 228 |
| 431 | −4 | 224 |
| 432 | −3 | 221 |
| 433 | −3 | 218 |
| 434 | −3 | 215 |
| 435 | −4 | 211 |
| 436 | −3 | 208 |
| 437 | −3 | 205 |
| 438 | −3 | 202 |
| 439 | −3 | 199 |
| 440 | −3 | 196 |
| 441 | −2 | 194 |
| 442 | −3 | 191 |
| 443 | −3 | 188 |
| 444 | −3 | 185 |
| 445 | −3 | 182 |
| 446 | −2 | 180 |
| 447 | −3 | 177 |
| 448 | −3 | 174 |
| 449 | −3 | 171 |
| 450 | −2 | 169 |
| 451 | −3 | 166 |
| 452 | −3 | 163 |
| 453 | −2 | 161 |
| 454 | −3 | 158 |
| 455 | −2 | 156 |
| 456 | −3 | 153 |
| 457 | −2 | 151 |
| 458 | −3 | 148 |
| 459 | −2 | 146 |
| 460 | −3 | 143 |
| 461 | −2 | 141 |
| 462 | −3 | 138 |
| 463 | −2 | 136 |
| 464 | −3 | 133 |
| 465 | −2 | 131 |
| 466 | −2 | 129 |
| 467 | −3 | 126 |
| 468 | −2 | 124 |
| 469 | −2 | 122 |
| 470 | −2 | 120 |
| 471 | −3 | 117 |
| 472 | −2 | 115 |
| 473 | −2 | 113 |
| 474 | −2 | 111 |
| 475 | −2 | 109 |
| 476 | −3 | 106 |
| 477 | −2 | 104 |
| 478 | −2 | 102 |
| 479 | −2 | 100 |
| 480 | −2 | 98 |
| 481 | −2 | 96 |
| 482 | −2 | 94 |
| 483 | −1 | 93 |
| 484 | −2 | 91 |
| 485 | −2 | 89 |
| 486 | −2 | 87 |
| 487 | −2 | 85 |
| 488 | −1 | 84 |
| 489 | −2 | 82 |
| 490 | −2 | 80 |
| 491 | −2 | 78 |
| 492 | −1 | 77 |
| 493 | −2 | 75 |
| 494 | −2 | 73 |
| 495 | −1 | 72 |
| 496 | −2 | 70 |
| 497 | −1 | 69 |
| 498 | −2 | 67 |
| 499 | −1 | 66 |
| 500 | −2 | 64 |
| 501 | −1 | 63 |
| 502 | −2 | 61 |
| 503 | −1 | 60 |
| 504 | −2 | 58 |
| 505 | −1 | 57 |
| 506 | −2 | 55 |
| 507 | −1 | 54 |
| 508 | −1 | 53 |
| 509 | −2 | 51 |
| 510 | −1 | 50 |
| 511 | −1 | 49 |
| 512 | −1 | 48 |
| 513 | −2 | 46 |
| 514 | −1 | 45 |
| 515 | −1 | 44 |
| 516 | −1 | 43 |
| 517 | −1 | 42 |
| 518 | −2 | 40 |
| 519 | −1 | 39 |
| 520 | −1 | 38 |
| 521 | −1 | 37 |
| 522 | −1 | 36 |
| 523 | −1 | 35 |
| 524 | −1 | 34 |
| 525 | 0 | 34 |
| 526 | −1 | 33 |
| 527 | −1 | 32 |
| 528 | −1 | 31 |
| 529 | −1 | 30 |
| 530 | 0 | 30 |
| 531 | −1 | 29 |
| 532 | −1 | 28 |
| 533 | −1 | 27 |
| 534 | 0 | 27 |
| 535 | −1 | 26 |
| 536 | −1 | 25 |
| 537 | 0 | 25 |
| 538 | −1 | 24 |
| 539 | 0 | 24 |
| 540 | −1 | 23 |
| 541 | 0 | 23 |
| 542 | −1 | 22 |
| 543 | 0 | 22 |
| 544 | −1 | 21 |

TABLE 1-continued

The TRUTH table of Pattern Generator

| S | D | V |
|---|---|---|
| 545 | 0 | 21 |
| 546 | −1 | 20 |
| 547 | 0 | 20 |
| 548 | −1 | 19 |
| 549 | 0 | 19 |
| 550 | 0 | 19 |
| 551 | −1 | 18 |
| 552 | 0 | 18 |
| 553 | 0 | 18 |
| 554 | 0 | 18 |
| 555 | −1 | 17 |
| 556 | 0 | 17 |
| 557 | 0 | 17 |
| 558 | 0 | 17 |
| 559 | 0 | 17 |
| 560 | −1 | 16 |
| 561 | 0 | 16 |
| 562 | 0 | 16 |
| 563 | 0 | 16 |

As will be appreciated by one of ordinary skill in the art, a feed digital delay line 34 functions to provide a selected delay to an input signal, the duration of which delay is dictated by an input thereto such is provided by the output of pattern generator 50. Thus, a clock signal 30 will be provided with a selected delay, as dictated by the output of the pattern generator 40, and this delay will be provided on output 52. It will be appreciated, therefore, that interaction between the counter 38, pattern generator 40 and digital delay line 34 will serve to provide a selected delay sequence to respective pulses of the clock signal at input 30, as it is output to output 52. In this fashion, the entire sequence of delay is suitably fabricated from digital elements and avoids implementation of the VCO/PLL circuitry as provided in connection with FIG. 1A, above.

Figure 3:
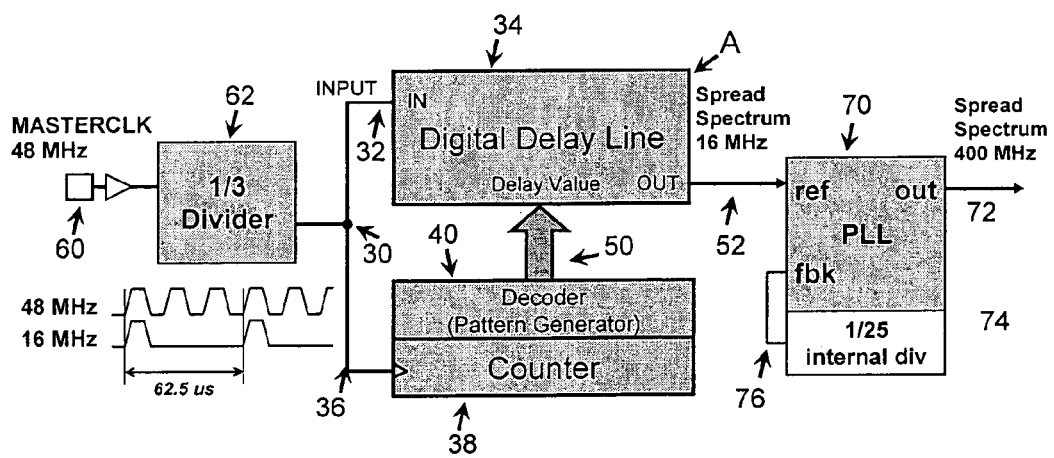
FIG. 3 is a block diagram of the spread spectrum clock generator of the subject invention inclusive of a master clock, the frequency of which is lowered prior to alteration of a frequency and raised after completion thereof.

Turning now to FIG. 3, the SSCG A of FIG. 1A is shown in connection with additional support circuitry. Conventional switching circuitry currently operates in the multi-gigahertz range. It will be appreciated that implementation of the counter, pattern generator and digital delay line, such as described herein, is more readily adapted to perform at lower frequencies than this. The additional structure of FIG. 3 accomplishes the beneficial advantages of the subject invention while facilitating use in connection with substantially higher clock frequencies. An input from a master clock 60 has communicated to a divider 62 to divide the frequency thereof. In the preferred embodiments, divider 62 is a ⅓ divider. By way of example, an input master clock frequency of 48 MHz provided at input 60 would result in a 16 MHz signal being provided at the output of divider 62, which forms the clock input 30. Thus, a period of 20.83 microseconds can be extended to a period of 62.5 microseconds. The function of the SSCG A is as described in connection with FIG. 2, above.

Turning now to the output 52 of digital delay line 34 in FIG. 3, in this embodiment the output forms an input to a phase lock loop 70. As will be appreciated by one of ordinary skill in the art, the PLL 70 suitably serves as a signal conditioner to clean an output pulse, as well as a system for stepping up an input frequency. The PLL 70 suitably takes an input of 16 MHz, as provided from the output 52 of the digital delay line 34, and outputs a substantially higher frequency, 400 MHz in the preferred embodiment and which output is provided at 72. Also, an internal divider 74 suitably provides feedback at terminal 76 to allow for the enhanced output at 72.

Figure 4:
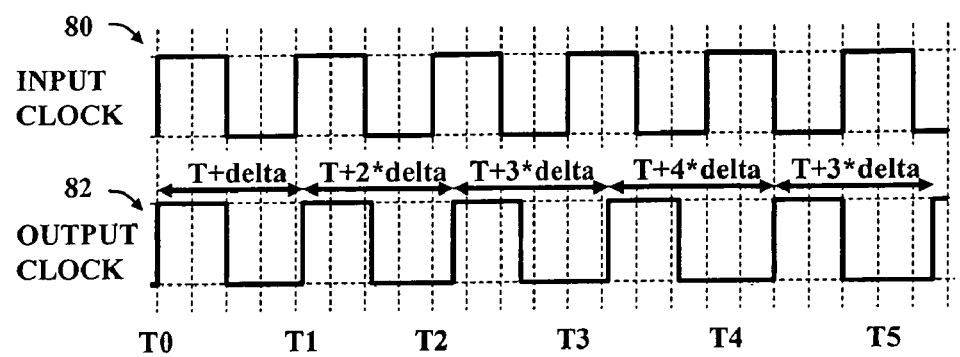
FIG. 4 is a diagram of the input clock wave form as compared to the output clock which has been processed for spread spectrum frequency modulation.

Turning now to FIG. 4, a comparison of an input clock and an output clock 82 is described as a function of time. The input clock shows a suitable system clock input, such as may be provided at digital delay line input 30 (FIG. 1A) or master clock input 60 (FIG. 2). An output waveform 82 evidences a skew in frequency as provided by the SSCG circuitry described above.

Turning now to Table 1, disclosed is a suitable true table of the content of a pattern generator such as described herein. In the preferred embodiment, the decoder content of the subject invention will be applied with every 564 clock cycles. In this fashion, a modulation frequency of around 28 KHz is provided. As used in Table 1, S refers to "step", D "delay value", and V refers to "decoder value". The step value S is incremented with every input clock pulse, such as that provided at input 30 (FIG. 1A or FIG. 2). A specified delay value and decoder value follows every increment of the counter 38. While the values of FIG. 1A are provided in the preferred embodiment, it will be appreciated that other suitable values may be implemented to accomplish the delays of the subject invention.

Turning now to Table 2, an example output of the pattern generator 40 is detailed. As evidenced in Table 2, the counter will increment at every input clock. At such point as a counter shows a value of 16, the next value will be reset to a 0. Thus, the pattern generator will decode a counter value to appear in the column "Pattern" and feed it to the delay line (50) (FIGS. 2 and 3). As noted above, the delay line 34 will delay an input clock by the value given from its input 50. By way of example, when a counter value is set at 0, delay value is 0. When a counter achieves 1, the delay is 1. Next, the delay value will skip 1 and the result will be 3. As evidenced in FIG. 2, the values of column DELTA P show the difference between each adjacent account. This sequence of delta values, up and down in the preferred embodiment, is evidenced therein.

TABLE 2

Example of pattern generator table

| Count | Pattern | DELTA T | Delta T |
|---|---|---|---|
| 0 | 0 | 0 | 0.00% |
| 1 | 1 | 1 | 0.05% |
| 2 | 3 | 2 | 0.10% |
| 3 | 6 | 3 | 0.15% |
| 4 | 10 | 4 | 0.20% |
| 5 | 13 | 3 | 0.15% |
| 6 | 15 | 2 | 0.10% |
| 7 | 16 | 1 | 0.05% |
| 8 | 16 | 0 | 0.00% |
| 9 | 15 | −1 | −0.05% |
| 10 | 13 | −2 | −0.10% |
| 11 | 10 | −3 | −0.15% |
| 12 | 6 | −4 | −0.20% |
| 13 | 3 | −3 | −0.15% |
| 14 | 1 | −2 | −0.10% |
| 15 | 0 | −1 | −0.05% |

Referring back to FIG. 3, when an input to the SSCG A is at a value T, a first period and its corresponding output is T1−T0, which is T+Δ. As used herein, Δ is a unidelay of the delay line. As used herein:

$T1-T0=T+\Delta$ $T2-T1=T+2*\Delta$ $T3-T2=T+3*\Delta$ $T4-T3=T+4*\Delta$ $T5-T4=T+3*\Delta$ As shown in the above, the frequency modulation can be achieved because the period during each clock cycle is changed.

Figure 5:
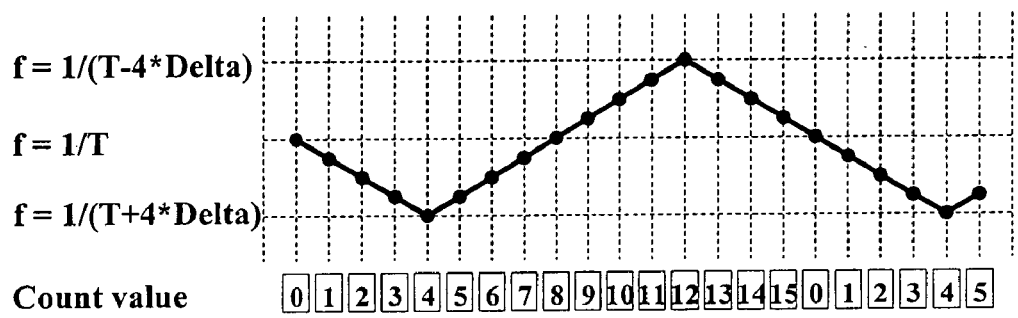
FIG. 5 is a graph of clock period versus frequency delta associated with the spread spectrum clock generation of the subject invention.

Turning now to FIG. 5, discloses a graph evidencing the frequency modulation scheme of the preferred embodiment. With the implementation described in the preferred embodiment, detailed above, it will be appreciated that the frequency modulation scheme employed by the circuitry of the subject invention provides for modulation analogous to that provided in conventional circuitry, as evidenced by FIG. 1B. Thus, the subject system provides for spread spectrum clock generation so as to provide all the advantages of the earlier system, but in a substantially improved, digital structure that is readily adaptable to integration and low cost and effective applications.

Figure 6:
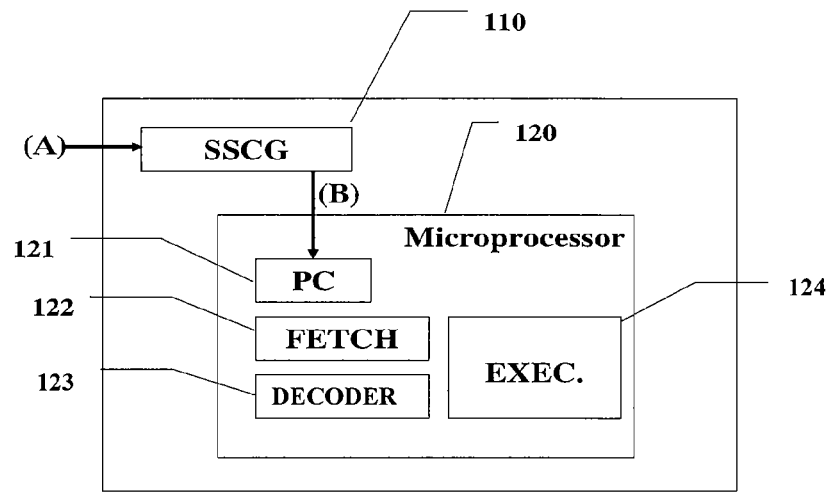
FIG. 6 is a diagram of an integrated circuit of the present invention.

FIG. 6 shows, as an example, of a diagram of an integrated circuit of the present invention. An integrated circuit 100 includes an SSCG 110 of the preset invention and a microprocessor 120. The SSCG 110 receives a constant clock (A) and provides a varying frequency clock (B) to the microprocessor 120. The microprocessor 120 includes at least a program counter 121, an instruction fetch unit 122, an instruction decoder 123, and an execution unit 124. The program counter 121 increments its stored value in response to the varying frequency clock. The microprocessor 120 can be either of a Reduced Instruction Set Computer ("RISC"), Complex Instruction Set Computer ("CISC"), or a Very Long Word Instruction computer ("VLIW"). A center frequency of the varying frequency clock to the microprocessor is, preferably, from 300 MHz to 900 MHz.

The integrated circuit shown in FIG. 6 can be manufactured by a semiconductor process technology with a design rule of 0.13 um or less. In other words, a gate length of a transistor element is of 0.13 um or less. The design rule of less than 0.1 um can be used employed, too. Further, copper can be used for an interconnection or wiring of the integrated circuit.

Figure 7:
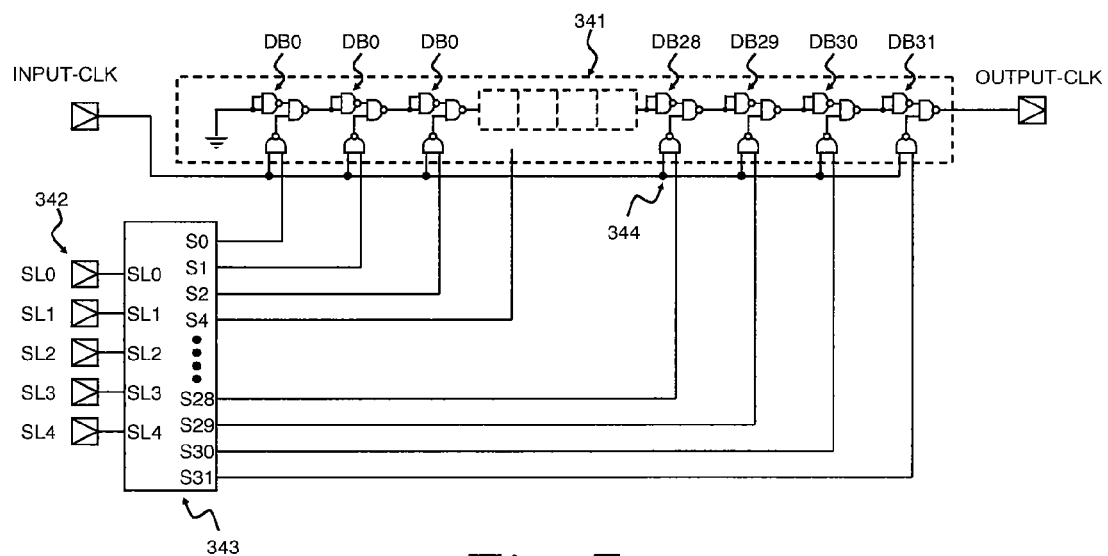
FIG. 7 is a diagram of used delay line circuit.
Figure 13:
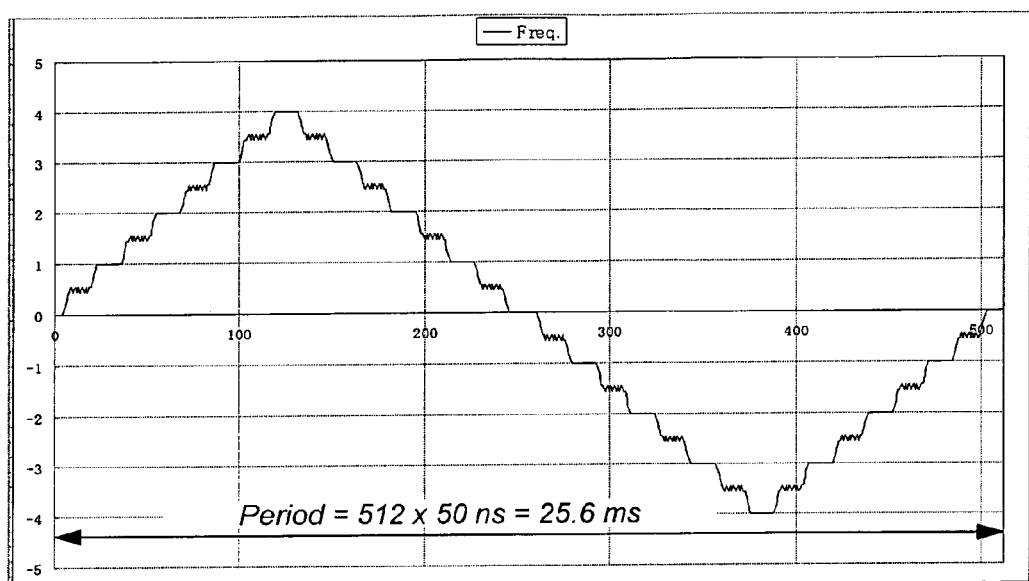
FIG. 13 shows the modulation waveform in the example of FIG. 12 pattern table.

FIG. 7 shows a diagram of the digital delay line 34 of the present invention. The digital delay line includes a plurality of delay elements (341), a one-hot decoder (343), and a set of delay value input (342), in response to the output of the decoder 40. Each of the delay elements consists of three NAND gates and it has clock injection input (344). The source clock will be injected in to the point where the rest of delay elements numbers is corresponding to the delay value. Because of this structure, the delay value input can be changed whenever the input clock is low level without hazard.

Earlier Systems allowed on circuit to generate "phase modulated" waveform if the content of pattern generator designed as such. FIG. 8a shows an example of an earlier "Phase Modulation" system. On the other hand, FIG. 8b shows the case of "Frequency Modulation" as is described herein.

FIG. 9a shows an example of "phase modulation pattern". By using this pattern, the output clock shows triangle waveform in its phase domain and square waveform in its frequency domain. From the spread spectrum viewpoint, this frequency spectrum is split to two frequencies, such as f0+Delta and f0−Delta. This result is shown in FIG. 9b.

FIG. 10a is an example of "Frequency Modulation pattern" based on this invention. The result is shown in FIG. 10b, where the phase modulation waveform is "integral waveform", which is resemble to Sine wave.

As illustrated in FIG. 8b, a clock input is received at terminal 400. A received clock signal is provided as an input a phase shifter 402. The phase shifter 402, in turn, receives frequency modulated pattern data from pattern generator 404 via interface 406. Thus, phase shifting is accomplished, suitably via a delay, at the phase shifter 402 in connection with the frequency encoded modulation pattern data.

As far as "Frequency Domain waveform concern, it shapes triangle waveform, means the frequency is sweeping between f0−5×Delta and f0+5×Delta. From the spectrum view point, it has been split out up to 11 kind of frequencies, such as f0−5×D, f0−4×D, f0−3×D, f0−2×D, f0−1×D, f0, f0+1×D, f0+2×D, f0+3×D, f0−4×D, and f0−5×D.

In FIG. 10, another type of implementation has been described. In this implementation, single non-SSCGed 20 MHz clock is used.

Turning to FIG. 11, disclosed is a sample embodiment of a circuit employing the spread spectrum clock generator of the subject application. A suitable clock signal is provided as an input 500 into a spread spectrum clock generating unit 510. As taught above, a unit 510 includes a delay line 512 adapted to receive pattern output from a pattern generator 514. The pattern generator 514, in turn, is incremented in connection with a counter 516 connected operatively thereto. The counter 516 increments in connection with an input clock signal received on input 500. In the disclosed embodiment, the delay line 512 is comprised of 512 stage lines. The output of the spread spectrum clock generator 510 forms input 520 to a phase lock loop (PLL) 522. In the disclosed embodiment, PLL 522 multiplies the input signal at 520 by 20 times. The resultant 400 MHz signal is communicated to a microprocessor 524, to form a clock input to allow the microprocessor to run at its selected rate. The 400 MHz signal also forms an input to dividers 526, 530 and 534 which are, in the disclosed example ⅓, ¼ and ⅙ dividers. The representative divisions allow for selected clock inputs to be placed into several illustrated components. The 400 MHz signal in the disclosed example, when divided by 3, provides a 133.33 MHz clock signal into DRAM controller 528. The same signal, when divided by 4 at the divider 530, provides a requisite 100 MHz signal to a representative structure of an ATA 100 MHz interface. Finally, the divide by 6 divider 534 provides a requisite 33.33 MHz to the illustrated PCI interface.

Thus, it would be appreciated by a review of the example structure of FIG. 11, the spread spectrum clock generator advantageously provides a means by which a suitable spread spectrum clock signal may be generated to several digital synchronous devices operating at various clock frequencies.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skilled in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

Having thus described the invention, it is now claimed:

1. A frequency modulated spread spectrum clock generator comprising:

means adapted for receiving a periodic clock signal having a generally constant frequency;

a frequency divider for generating a lower frequency clock signal from a received periodic clock signal;

a programmable digital delay line adapted to receive the lower frequency clock signal, and including means provide a selected delay to the lower frequency clock signal in accordance with a received digital delay value so as to form a varying frequency clock signal;

a counter for generating a pre-selected digital sequence;

a pattern generator adapted for generating the digital delay value in accordance with the pre-selected digital sequence encoded as frequency modulation data;

a frequency multiplier for increasing a frequency of the varying frequency clock signal so as to generate a spread spectrum clock signal; and means adapted for communicating the spread spectrum clock signal to an associated digital device.

2. The spread spectrum clock generator of claim 1 wherein the spread spectrum clock signal has a frequency range between $1/(T-N\Delta)$ and $1/(T+N\Delta)$, wherein T is defined as a period of the clock input signal, N can be any number greater than 1, and $\Delta$ is defined as a unit of the selected delay.

3. The spread spectrum clock generator of claim 2 wherein the frequency range of the spread spectrum clock signal linearly alternates between $1/(T-N\Delta)$ and $1/(T+N\Delta)$.

4. The spread spectrum clock generator of claim 3 wherein the frequency range of the spread spectrum clock signal varies from −0.2% to +0.2% of the periodic clock signal.

5. The spread spectrum clock generator of claim 4 wherein the pattern generator includes digital delay value generator to output the digital delay value in accordance with values disposed in a pre-selected truth table.

6. The spread spectrum clock generator of claim 3 wherein the counter operates response to the periodic clock signal.

7. A frequency modulated spread spectrum clock generator comprising:

a clock input adapted for receiving a clock signal having a generally constant frequency;

a digital delay having:
a delay input coupled to the clock input,
a data input adapted for receiving a delay data representative of a selected delay, the delay data being encoded in a frequency modulation pattern, and
a clock output providing a modified clock signal, the frequency of the modified clock signal is adjusted in accordance with the delay data; and a numeric sequencer coupled to the clock input and adapted for generating the delay data;

wherein the numeric sequencer includes:
a binary counter adapted for generating a binary output sequence, and
a pattern generator adapted for receiving the binary output sequence from the binary counter;

wherein the pattern generator generates the delay data as a function of the binary output sequence; and wherein the modified clock signal has a frequency range between $1/(T-N\Delta)$ and $1/(T+N\Delta)$, wherein T is defined as a period of the clock input signal, N is a number greater than 1, and $\Delta$ is defined as a unit of the selected delay.

8. The spread spectrum clock generator of claim 7 wherein the frequency range of the modified clock signal linearly alternates between $1/(T-N\Delta)$ and $1/(T+N\Delta)$.

9. The spread spectrum clock generator of claim 8 further comprising a signal conditioner adapted for receiving the modified clock signal and generating a conditioned clock signal in accordance with the modified clock signal.

10. The spread spectrum clock generator of claim 9 wherein the signal conditioner further comprises a frequency multiplier.

11. The spread spectrum clock generator of claim 10 wherein the signal conditioner includes a phase lock loop.

12. A method of spreading a spectrum of an electromagnetic interference generated by an integrated circuit comprising:

receiving a clock signal having a generally constant frequency;

generating a low frequency clock signal in response to the received clock signal;

generating selected numeric output data representative of a selected numeric sequence, the numeric output data being representative of a frequency modulated pattern generated in response to the received clock signal; and generating a varying frequency clock signal from the low frequency clock signal, the varying frequency clock signal having a delay set in accordance with the selected numeric output sequence;

wherein the step of generating selected numeric output data includes:
incrementing a counter data in response to the received clock signal;
generating a pattern data that corresponds to the counter data; and
generating the selected numeric sequence in accordance with the pattern data; and wherein the step of generating pattern data includes generating the varying frequency clock signal in accordance with values associated with a pre-selected truth table.

13. The method of spreading a spectrum of claim 12 wherein the varying frequency clock signal has a frequency range between $1/(T-N\Delta)$ and $1/(T+N\Delta)$, wherein T is defined as a period of the clock input signal, N is a number greater than 1, and $\Delta$ is defined as a unit of the selected delay.

14. The method of spreading a spectrum of claim 13 wherein the frequency range of the varying frequency clock signal linearly alternates between $1/(T-N\Delta)$ and $1/(T+N\Delta)$.

15. The method of spreading a spectrum of claim 14 wherein the frequency range of the varying frequency clock signal varies from −0.2% to ×0.2% of the periodic clock signal.

* * * * *